United States Patent
Lemmers, Jr. et al.

(10) Patent No.: US 10,344,845 B2
(45) Date of Patent: Jul. 9, 2019

(54) SUN GEAR FOR AN INTEGRATED DRIVE GENERATOR

(71) Applicant: Hamilton Sundstrand Corporation, Charlotte, NC (US)

(72) Inventors: Glenn C. Lemmers, Jr., Loves Park, IL (US); Aaron M. Finke, Janesville, WI (US); Doren C. Smith, Rockford, IL (US); Andrew P. Grosskopf, Rockford, IL (US); David S. Behling, Belvidere, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 973 days.

(21) Appl. No.: 14/677,619

(22) Filed: Apr. 2, 2015

(65) Prior Publication Data

US 2016/0290468 A1    Oct. 6, 2016

(51) Int. Cl.
| | |
|---|---|
| *F16H 55/17* | (2006.01) |
| *F16H 57/037* | (2012.01) |
| *F16H 57/08* | (2006.01) |
| *B64D 41/00* | (2006.01) |
| *F16H 3/72* | (2006.01) |

(52) U.S. Cl.
CPC ............ *F16H 55/17* (2013.01); *B64D 41/00* (2013.01); *F16H 57/037* (2013.01); *F16H 57/08* (2013.01); *F16H 3/721* (2013.01); *F16H 57/082* (2013.01)

(58) Field of Classification Search
CPC ...................................................... F16H 13/08
See application file for complete search history.

(56) References Cited

U.S. PATENT DOCUMENTS

| | | |
|---|---|---|
| 4,252,035 A | 2/1981 | Cordner et al. |
| 4,488,053 A | 12/1984 | Cronin |
| 4,734,590 A | 3/1988 | Fluegel |
| 4,953,663 A | 9/1990 | Sugden |
| 4,965,477 A | 10/1990 | Stadler et al. |
| 5,028,803 A | 7/1991 | Reynolds |
| 5,845,731 A | 12/1998 | Buglione et al. |
| 6,258,004 B1 | 7/2001 | Johnston |
| 6,799,953 B2 | 10/2004 | Nelson |
| 7,472,547 B2 | 1/2009 | Grosskopf et al. |
| 8,925,421 B2 | 1/2015 | Vanderzyden et al. |
| 9,115,794 B2 | 8/2015 | Vanderzyden et al. |
| 2005/0006164 A1 | 1/2005 | Teraoka |
| 2006/0079370 A1* | 4/2006 | Kushino ............... B60K 6/365 |
| | | 475/221 |
| 2009/0101465 A1 | 4/2009 | Hart et al. |
| 2013/0068057 A1 | 3/2013 | Grosskoph |
| 2013/0288840 A1 | 10/2013 | Grosskopf et al. |
| 2014/0008170 A1 | 1/2014 | Vanderzyden et al. |
| 2015/0013488 A1 | 1/2015 | Matsuoka et al. |
| 2016/0003339 A1 | 1/2016 | Roberts, III et al. |
| 2016/0016368 A1 | 1/2016 | Kunishima |

* cited by examiner

*Primary Examiner* — Derek D Knight
(74) *Attorney, Agent, or Firm* — Cantor Colburn LLP

(57) ABSTRACT

A sun gear for an integrated drive generator (IDG) includes a sun gear body having an outer diametric edge and an inner diametric wall. The outer diametric edge includes 33 gear teeth.

17 Claims, 5 Drawing Sheets

SUN GEAR FOR AN INTEGRATED DRIVE GENERATOR

BACKGROUND

Exemplary embodiments pertain to the art of integrated drive generators and, more particularly, to a sun gear for an integrated drive generator.

Many aircraft employ constant speed drives to provide a motive force to a generator. The generator, typically an alternating current (AC) generator, produces an electrical output. Generally, it is desirable for the electrical output to be at a constant frequency. To produce the desired constant frequency, it is further desirable to drive the generator at a constant speed. The constant speed drive provides an interface between an aircraft engine output and the generator. The constant speed drive converts a variable speed input from the aircraft engine to a constant speed output that provides the desired motive force to the generator. In some cases, the constant speed drive and the generator are combined to form an integrated drive generator.

BRIEF DESCRIPTION

Disclosed is a sun gear for an integrated drive generator (IDG) including a sun gear body having an outer diametric edge and an inner diametric wall. The outer diametric edge includes 33 gear teeth.

Also disclosed is an integrated drive generator (IDG) includes a housing, and a differential gear system arranged within the housing. The differential gear system including a sun gear having a sun gear body including an outer diametric edge and an inner diametric wall. The outer diametric edge includes 33 gear teeth.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
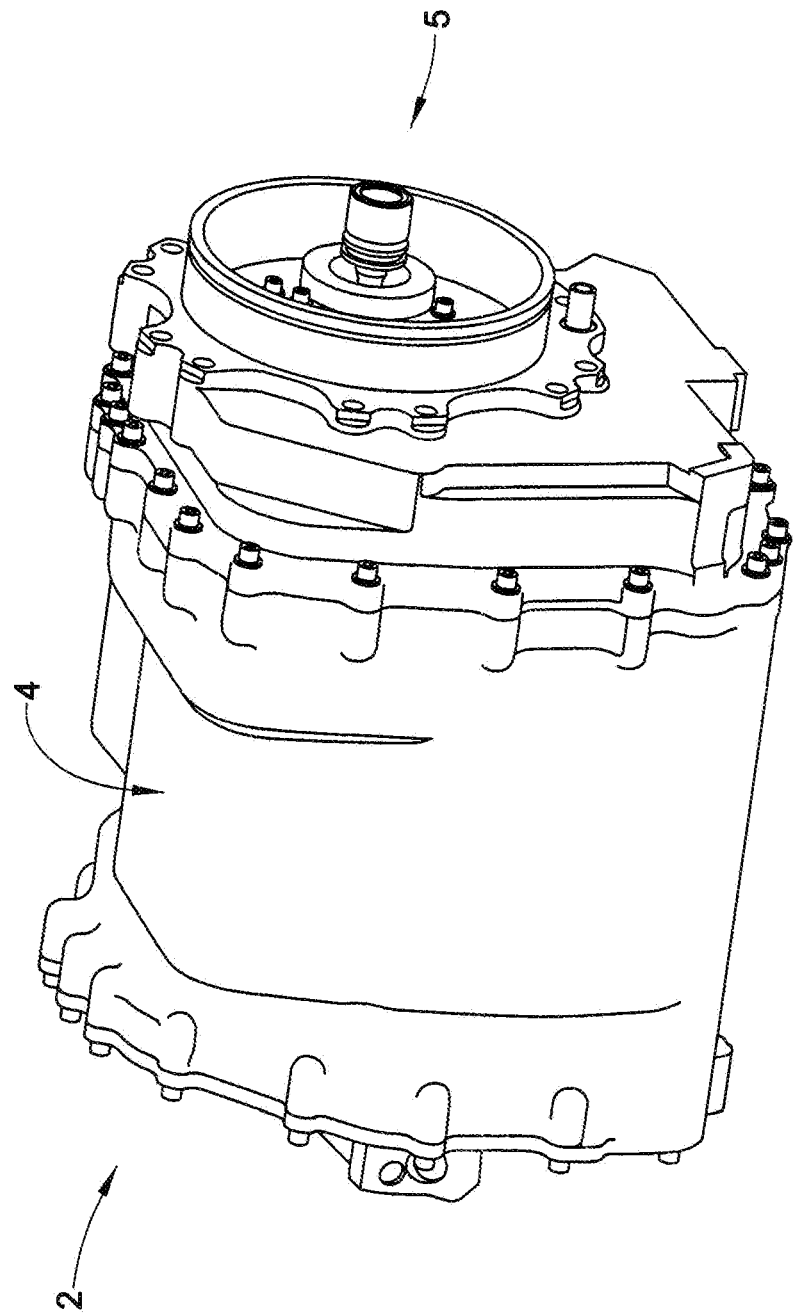
FIG. 1 depicts an integrated drive generator including a differential gear system having a sun gear, in accordance with an exemplary embodiment.
Figure 2:
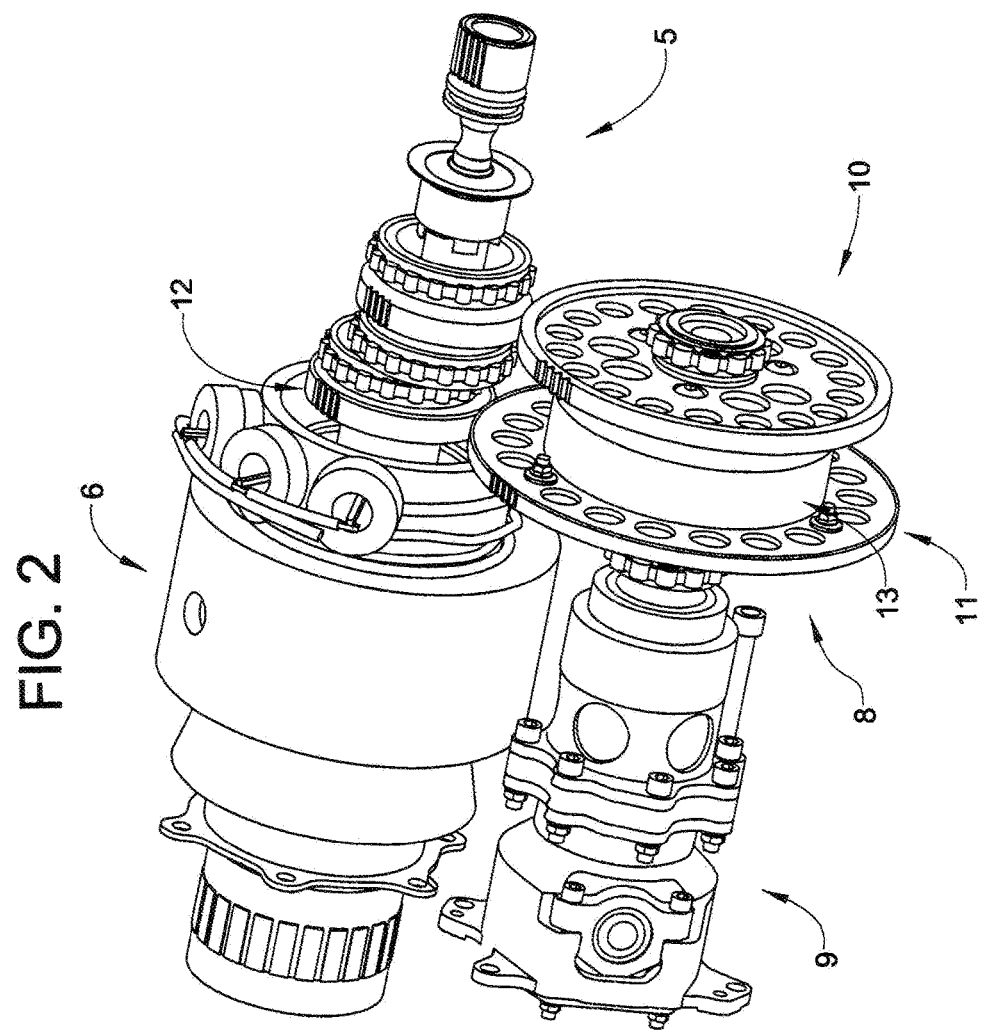
FIG. 2 depicts a generator and a differential gear system, in accordance with an exemplary embodiment.
Figure 3:
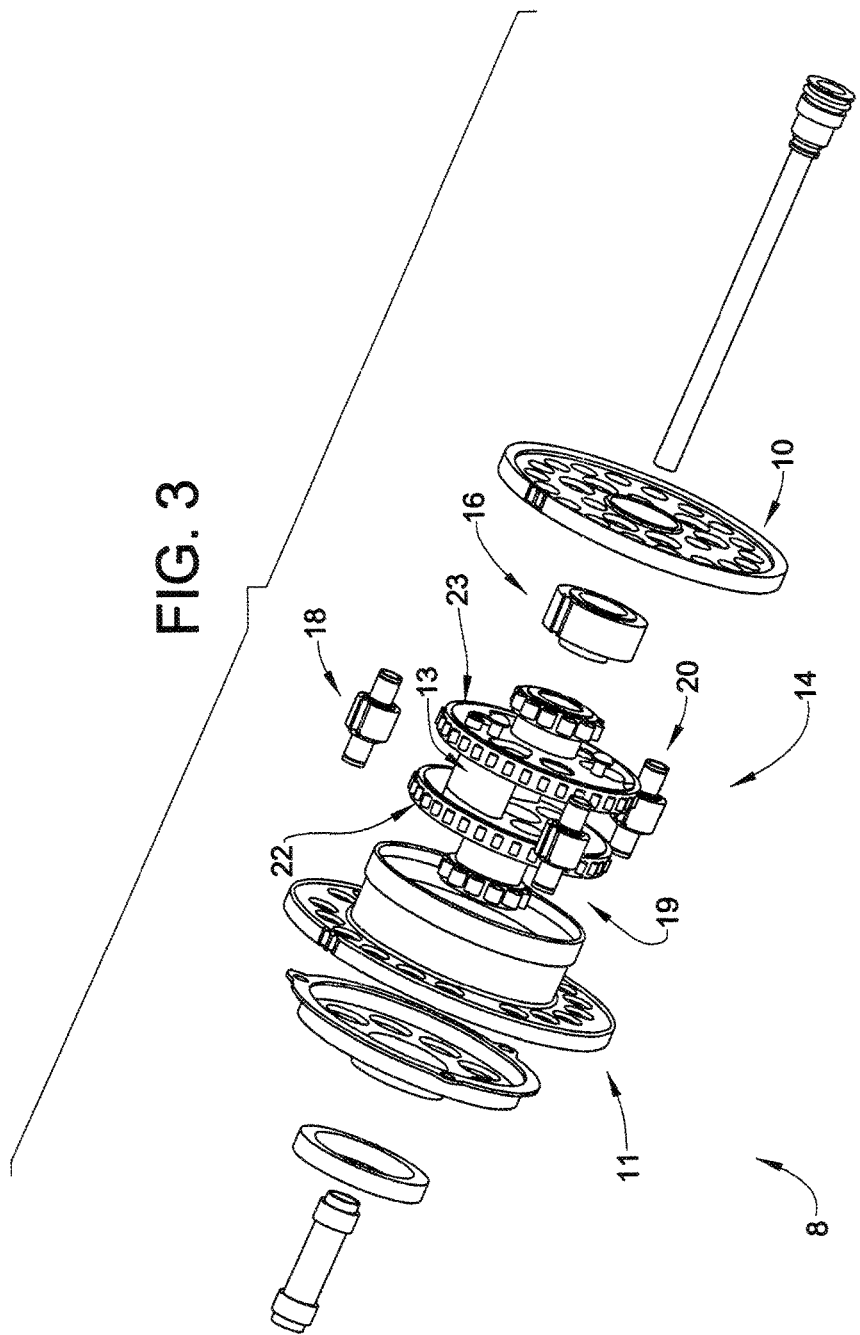
FIG. 3 depicts a partially exploded view of the differential gear system of FIG. 2.
Figure 4:
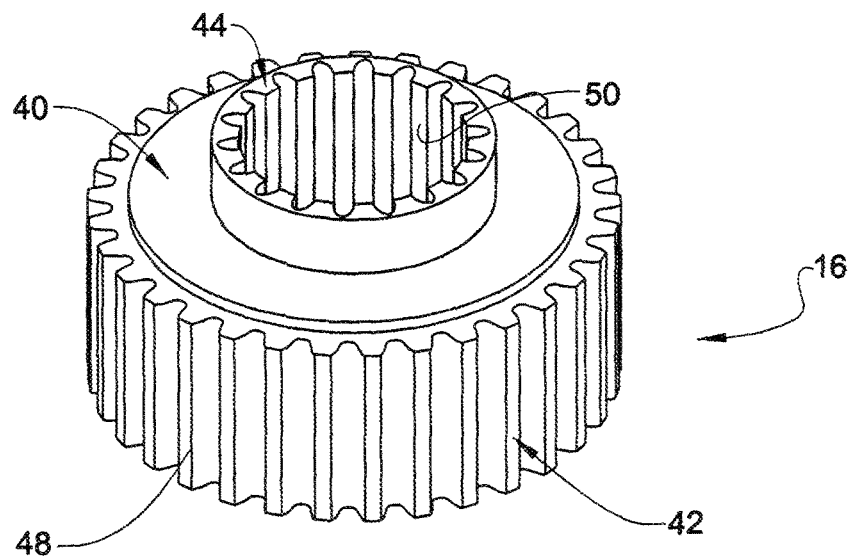
FIG. 4 depicts a perspective view of the sun gear, in accordance with an exemplary embodiment.
Figure 5:
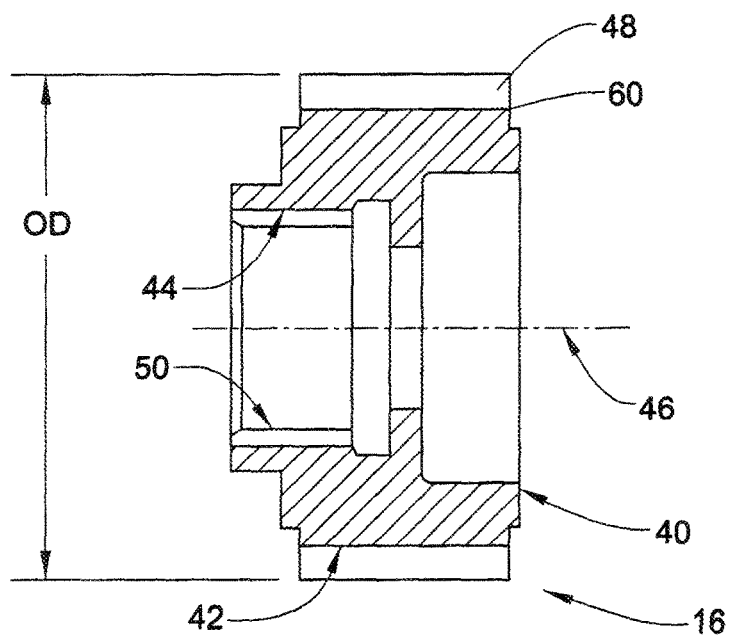
FIG. 5 depicts a plan view of the sun gear of FIG. 4.
Figure 6:
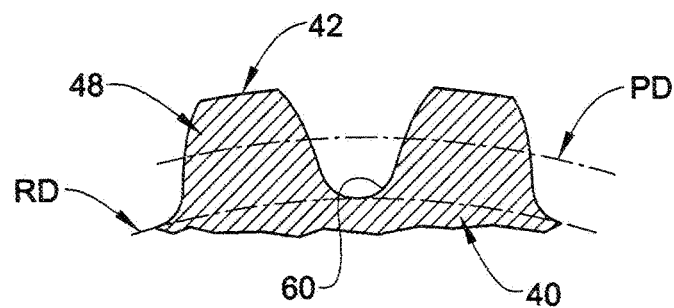
FIG. 6 depicts a plurality of outer gear teeth of the sun gear of FIG. 4.
Figure 7:
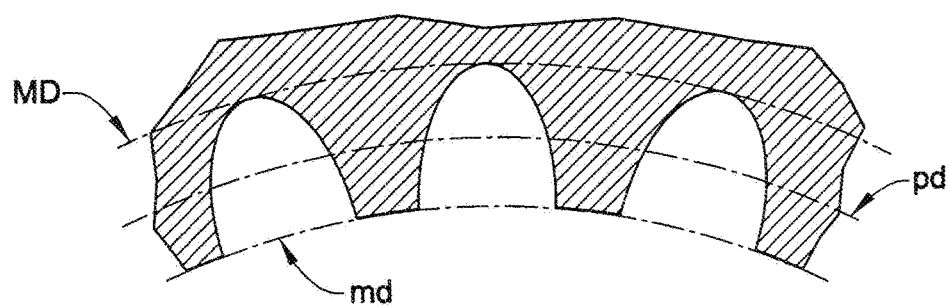
FIG. 7 depicts a plurality of inner splines of the sun gear of FIG. 4.

An integrated drive generator (IDG), in accordance with an exemplary embodiment, is indicated generally at 2, in FIGS. 1-3. IDG 2 includes a housing 4 that surrounds an input system 5 operatively coupled to a variable speed drive source (not shown), a generator 6 and an epicyclic differential gear system 8 coupled to a hydraulic unit 9. As will be detailed more fully below, epicyclic differential gear system 8 converts a variable speed input from the variable speed drive source into a constant speed output employed to drive generator 6. In accordance with an aspect of an exemplary embodiment, the variable speed drive source takes the form of an aircraft engine. However, it should be understood, that the variable speed drive source may take on a variety of forms.

Epicyclic differential gear system 8 includes an input driven gear 10 coupled to input system 5 and an output or ring gear 11. Ring gear 11 engages with a driven gear 12 on generator 6. Ring gear 11 is also coupled to a carrier 13. Carrier 13 also supports a planet gear system 14 and a sun gear 16. Sun gear 16 is operatively connected to hydraulic system 9. Planet gear system 14 includes a first planet gear 18, a second planet gear 19, and a third planet gear 20. First, second, and third planet gears 18-20 are supported for rotation between a first planet gear support 22 and a second planet gear support 23 of carrier 13.

Reference will now follow to FIGS. 4-7 in describing sun gear 16 in accordance with an exemplary embodiment. Sun gear 16 includes a sun gear body 40 having an outer diametric edge 42 and an inner diametric wall 44 having a center 46. Outer diametric edge 42 includes a plurality of outer gear teeth 48. Outer gear teeth 48 are 33 in number, in accordance with an exemplary embodiment. Inner diametric wall 44 includes a plurality of inner splines 50. Inner splines 50 are 18 in number.

In accordance with an exemplary embodiment, sun gear 16 includes a root diameter (RD) or a diameter of sun gear body 40 defined between base portions 60 of opposing ones of outer gear teeth 48 through center 46. In accordance with an aspect of an exemplary embodiment, the root diameter of outer gear teeth 48 is between about 1.497-inch (3.802-cm) and about 1.510-inch (3.835-cm). In accordance with another aspect of an exemplary embodiment, the root diameter is about 1.510-inch (3.835-cm). In further accordance with an exemplary embodiment, outer gear teeth 48 include a pitch diameter (PD) of about 1.650-inch (4.191-cm).

In accordance with yet another aspect of an exemplary embodiment, inner splines 50 define a major diameter of between about 0.825-inch (2.095-cm) and about 0.839-inch (2.131-cm). In accordance with another aspect of an exemplary embodiment, inner splines 50 define a major diameter (MD) of about 0.825-inch (2.095-cm). In accordance with another aspect of an exemplary embodiment, inner splines 50 define a minor diameter (md) of between about 0.708-inch (1.798-cm) and about 0.713-inch (1.811-cm). In accordance with yet another aspect of an exemplary embodiment, inner splines 50 define a minor diameter of about 0.708-inch (1.798-cm). In accordance with yet another aspect of an exemplary embodiment inner splines 50 include a pitch diameter (PD) of about 0.75-inch (1.905-cm).

In accordance with another aspect of an exemplary embodiment, outer gear teeth 48 define an outer diameter (OD) of sun gear body 40 of between about 1.742-inch (4.425-cm) and about 1.745-inch (4.432-cm). In accordance with another aspect of an exemplary embodiment, outer gear teeth 48 define an outer diameter of the sun gear body 40 of about 1.745-inch (4.432-cm). The sun gear 16, in accordance with an exemplary embodiment, provides a desired variable speed input to epicyclic differential gear system 8 while maintaining a desired form factor that is accommodated by housing 4.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The term "about" is intended to include the degree of error associated with measurement of the particular quantity based upon the equipment available at the time of filing the application. For example, "about" can include a range of ±8% or 5%, or 2% of a given value.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A sun gear for an integrated drive generator (IDG) comprising:
   a sun gear body including an outer diametric edge and an inner diametric wall, the outer diametric edge including 33 gear teeth,
   wherein the inner diametric wall comprises a plurality of inner splines,
   wherein the plurality of inner splines are 18 in number,
   wherein each of the plurality of inner splines comprise a major diameter, a minor diameter, and a pitch diameter.

2. The sun gear according to claim 1, wherein the 33 gear teeth include a root diameter of between about 1.497-inch (3.802-cm) and about 1.510-inch (3.835-cm).

3. The sun gear according to claim 2, wherein the 33 gear teeth include a root diameter of about 1.510-inch (3.835-cm).

4. The sun gear according to claim 1, wherein the 33 gear teeth include a pitch diameter of about 1.650-inch (4.191-cm).

5. The sun gear according to claim 1, wherein the 18 splines include the major diameter of between about 0.825-inch (2.095-cm) and about 0.839-inch (2.131-cm).

6. The sun gear according to claim 1, wherein the 18 splines include the minor diameter of between about 0.708-inch (1.798-cm) and about 0.713-inch (1.811-cm).

7. The sun gear according to claim 1, wherein the 18 splines include the pitch diameter of about 0.75-inch (1.905-cm).

8. The sun gear according to claim 1, wherein the 33 gear teeth define an outer diameter of the sun gear body of between about 1.742-inch (4.425-cm) and about 1.745-inch (4.432-cm).

9. An integrated drive generator (IDG) comprising:
   a housing; and
   a differential gear system arranged within the housing, the differential gear system including a sun gear having a sun gear body including an outer diametric edge and an inner diametric wall, the outer diametric edge including 33 gear teeth,
   wherein the inner diametric wall comprises a plurality of inner splines,
   wherein the plurality of inner splines are 18 in number,
   wherein each of the plurality of inner splines comprise a major diameter, a minor diameter, and a pitch diameter.

10. The integrated drive generator according to claim 9, wherein the 33 gear teeth include a root diameter of between about 1.497-inch (3.802-cm) and about 1.510-inch (3.835-cm).

11. The integrated drive generator according to claim 9, wherein the inner diametric wall includes 18 splines.

12. The integrated drive generator according to claim 11 wherein the 18 splines include a major diameter of between about 0.825-inch (2.095-cm) and about 0.839-inch (2.131-cm).

13. The integrated drive generator according to claim 11, wherein the 18 splines include a minor diameter of between about 0.708-inch (1.798-cm) and about 0.713-inch (1.811-cm).

14. The integrated drive generator according to claim 9, wherein the 33 gear teeth define an outer diameter of the sun gear body of between about 1.742-inch (4.425-cm) and about 1.745-inch (4.432-cm).

15. The integrated drive generator according to claim 9, wherein the 18 splines include the major diameter of between about 0.825-inch (2.095-cm) and about 0.839-inch (2.131-cm).

16. The integrated drive generator according to claim 9, wherein the 18 splines include the minor diameter of between about 0.708-inch (1.798-cm) and about 0.713-inch (1.811-cm).

17. The integrated drive generator according to claim 9, wherein the 18 splines include the pitch diameter of about 0.75-inch (1.905-cm).

* * * * *